US009361558B2

(12) United States Patent
Ishida et al.

(10) Patent No.: US 9,361,558 B2
(45) Date of Patent: Jun. 7, 2016

(54) IMAGE FORMING APPARATUS AND IMAGE FORMING METHOD

(71) Applicants: Masaaki Ishida, Kanagawa (JP); Atsufumi Omori, Kanagawa (JP); Muneaki Iwata, Kanagawa (JP); Hayato Fujita, Kanagawa (JP)

(72) Inventors: Masaaki Ishida, Kanagawa (JP); Atsufumi Omori, Kanagawa (JP); Muneaki Iwata, Kanagawa (JP); Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/257,435

(22) Filed: Apr. 21, 2014

(65) Prior Publication Data
US 2014/0327938 A1 Nov. 6, 2014

(30) Foreign Application Priority Data

May 2, 2013 (JP) ................................. 2013-097055

(51) Int. Cl.
| | | |
|---|---|---|
| G06K 15/02 | (2006.01) | |
| G06T 5/00 | (2006.01) | |
| G06T 3/40 | (2006.01) | |
| G03G 15/043 | (2006.01) | |
| G03G 15/00 | (2006.01) | |

(52) U.S. Cl.
CPC .......... *G06K 15/1881* (2013.01); *G03G 15/043* (2013.01); *G06T 3/40* (2013.01); *G03G 15/5054* (2013.01); *G03G 15/5058* (2013.01); *G06T 3/403* (2013.01); *G06T 3/4007* (2013.01); *G06T 5/002* (2013.01); *G06T 5/003* (2013.01)

(58) Field of Classification Search
CPC ....... G06T 3/40; G06T 3/4007; G06T 3/4023; G06T 3/403; G06T 5/001; G06T 5/002; G06T 5/003

USPC ................................................ 358/3.26, 3.27
See application file for complete search history.

(56) References Cited

U.S. PATENT DOCUMENTS

| | | | | | |
|---|---|---|---|---|---|
| 4,780,768 | A | * | 10/1988 | Tomohisa et al. ............ | 358/3.07 |
| 5,650,858 | A | * | 7/1997 | Lund ............................. | 358/3.15 |

(Continued)

FOREIGN PATENT DOCUMENTS

| | | |
|---|---|---|
| JP | 2004-282344 | 10/2004 |
| JP | 2005-156380 | 6/2005 |

(Continued)

OTHER PUBLICATIONS

U.S. Appl. No. 14/072,946, filed Nov. 6, 2013.

(Continued)

*Primary Examiner* — Richard Zhu
(74) *Attorney, Agent, or Firm* — Oblon, McClelland, Maier & Neustadt, L.L.P.

(57) ABSTRACT

An image forming apparatus forms an image by irradiating light from a light source to an image carrier. The image forming apparatus includes: an image processing unit that processes image data at resolution N; and a control unit that generates modulation data to drive the light source at resolution m×N (m is a positive integer equal to or larger than 2), which is higher than the resolution N, based on the processed image data. Processing at the image processing unit is pseudo-halftone processing to perform line thinning or thickening on a part of the image data. The control unit converts the image data at the resolution N that has been subjected to the pseudo-halftone processing into data at the resolution m×N, and adjusts an amount of light for a part of the image data based on the resolution m×N.

5 Claims, 15 Drawing Sheets

(56) References Cited

U.S. PATENT DOCUMENTS

| | | | |
|---|---|---|---|
| 6,678,426 B1* | 1/2004 | Bearss et al. | 382/299 |
| 6,834,124 B1* | 12/2004 | Lin et al. | 382/261 |
| 7,139,442 B2* | 11/2006 | Ebner et al. | 382/299 |
| 7,327,904 B2* | 2/2008 | Zhou et al. | 382/299 |
| 7,496,121 B2 | 2/2009 | Ishida et al. | |
| 7,719,481 B2* | 5/2010 | Gormish | 345/2.1 |
| 8,237,760 B2 | 8/2012 | Nihei et al. | |
| 8,310,516 B2 | 11/2012 | Tanabe et al. | |
| 2003/0025785 A1 | 2/2003 | Nihei et al. | |
| 2005/0089069 A1 | 4/2005 | Ozasa et al. | |
| 2005/0146596 A1 | 7/2005 | Nihei et al. | |
| 2005/0243163 A1 | 11/2005 | Ozasa et al. | |
| 2006/0098232 A1* | 5/2006 | Nakano et al. | 358/3.26 |
| 2006/0285186 A1 | 12/2006 | Ishida et al. | |
| 2007/0091163 A1 | 4/2007 | Omori et al. | |
| 2007/0132828 A1 | 6/2007 | Ishida et al. | |
| 2008/0088893 A1 | 4/2008 | Ishida et al. | |
| 2008/0123160 A1 | 5/2008 | Omori et al. | |
| 2008/0225106 A1 | 9/2008 | Omori et al. | |
| 2008/0239336 A1 | 10/2008 | Tanabe et al. | |
| 2008/0291259 A1 | 11/2008 | Nihei et al. | |
| 2008/0298842 A1 | 12/2008 | Ishida et al. | |
| 2009/0303451 A1 | 12/2009 | Miyake et al. | |
| 2010/0214637 A1 | 8/2010 | Nihei et al. | |
| 2011/0199657 A1 | 8/2011 | Ishida et al. | |
| 2011/0228037 A1 | 9/2011 | Omori et al. | |
| 2011/0304683 A1 | 12/2011 | Ishida et al. | |
| 2011/0304867 A1* | 12/2011 | Tokoyama et al. | 358/1.9 |
| 2012/0099165 A1 | 4/2012 | Omori et al. | |
| 2012/0189328 A1 | 7/2012 | Suzuki et al. | |
| 2012/0293783 A1 | 11/2012 | Ishida et al. | |
| 2013/0033558 A1 | 2/2013 | Akatsu et al. | |
| 2013/0120802 A1* | 5/2013 | Shimamura | 358/447 |
| 2013/0243459 A1 | 9/2013 | Omori et al. | |
| 2013/0302052 A1 | 11/2013 | Iwata et al. | |

FOREIGN PATENT DOCUMENTS

| | | |
|---|---|---|
| JP | 4026271 | 10/2007 |
| JP | 4067771 | 1/2008 |
| JP | 2008-040088 | 2/2008 |
| JP | 2012-237875 A | 12/2012 |

OTHER PUBLICATIONS

U.S. Appl. No. 14/082,628, filed Nov. 18, 2013.
U.S. Appl. No. 14/140,147, filed Dec. 24, 2013.
U.S. Appl. No. 14/193,271, filed Feb. 18, 2014.
U.S. Appl. No. 14/268,463, filed May 2, 2014.
Extended European Search Report issued Feb. 5, 2015 in EP 14165848.4.

* cited by examiner

FIG.9A
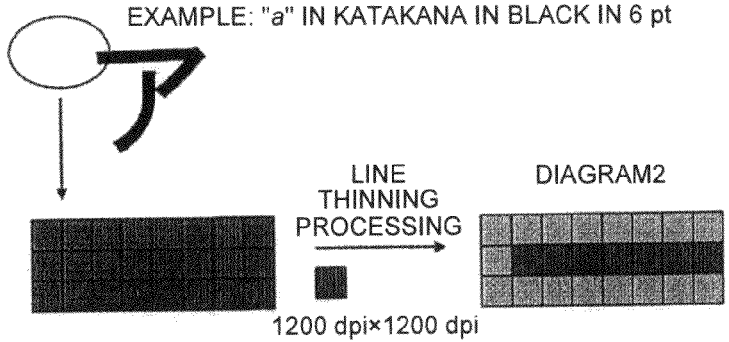
DIAGRAM 1
EXAMPLE: "a" IN KATAKANA IN BLACK IN 6 pt
LINE THINNING PROCESSING
1200 dpi×1200 dpi
DEFAULT:
ALL BINARY BLACK
DIAGRAM2
THINNED BY MAKING EDGE PORTION IN HALFTONE
FIG.9B
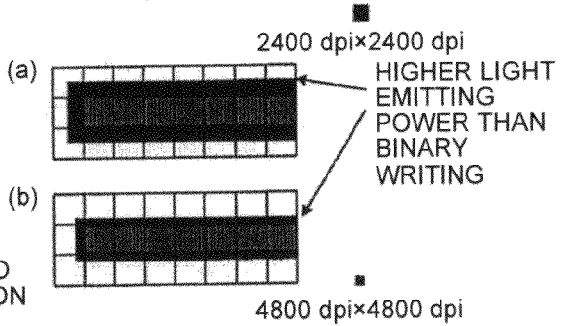
DIAGRAM 1
DIAGRAM 2
(a) 2400 dpi×2400 dpi
HIGHER LIGHT EMITTING POWER THAN BINARY WRITING
(b) 4800 dpi×4800 dpi
CONVERSION INTO HIGHER RESOLUTION
+
EDGE ENHANCEMENT PROCESSING

FIG.10A
DIAGRAM 1
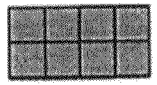
CASE OF 1 LINE at 1200 dpi IN ALL HALFTONE
DIAGRAM 2
PERIPHERAL GRAY REGION
INDICATES ORIGINAL REGION
FIG.10B
DIAGRAM 1 
CASE OF 1 LINE at 1200 dpi IN ALL HALFTONE
DIAGRAM 2 
FIG.10C
DIAGRAM 1
CASE OF 1 DOT AT 1200 dpi IN ALL HALFTONE
DIAGRAM 2

FIG.12
(A)
OPTICAL WAVEFORM IN 1 DOT AT POWER P1
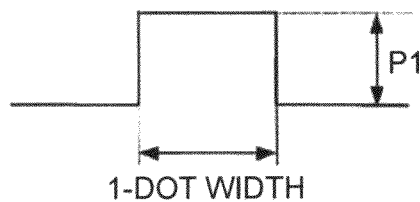
1-DOT WIDTH
(B)
OPTICAL WAVEFORM IN 1/2 DOT AT POWER P1
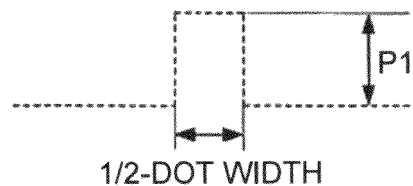
1/2-DOT WIDTH
(C)
OPTICAL WAVEFORM IN 1/2 DOT AT POWER P1×2
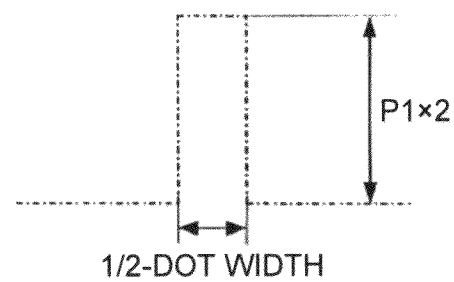
1/2-DOT WIDTH
(D)
ENERGY DISTRIBUTION
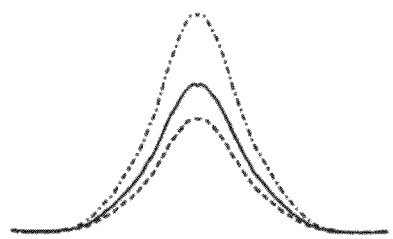

FIG.16A
TONER ADHESION
AMOUNT DISTRIBUTION
OF COMPARATIVE
EXAMPLE 1
"sumi" IN 3 pt GOTHIC
NO CORRECTION
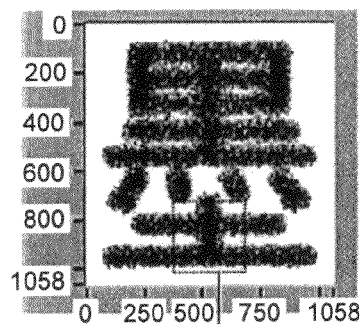
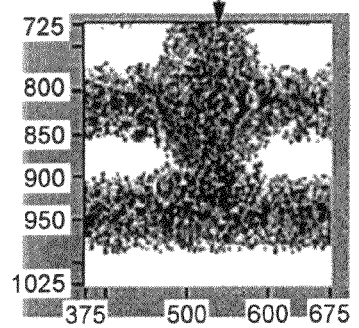
FIG.16B
TONER ADHESION
AMOUNT DISTRIBUTION
OF COMPARATIVE
EXAMPLE 2
POWER AT EDGE 50%
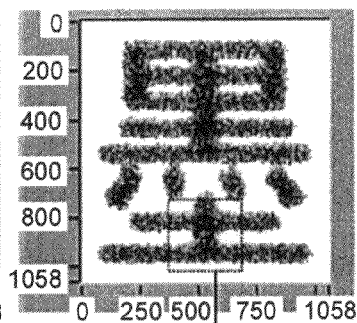
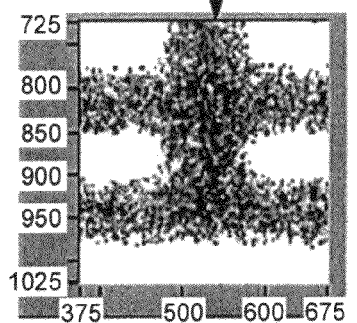
FIG.16C
TONER ADHESION
AMOUNT DISTRIBUTION
OF PRESENT
EMBODIMENT
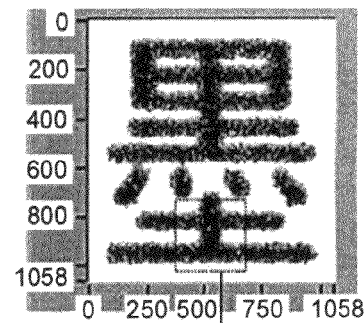
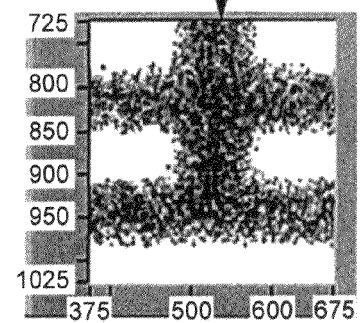

FIG.17A
DIAGRAM 1
EXAMPLE: "a" IN KATAKANA IN BLACK IN 6 pt
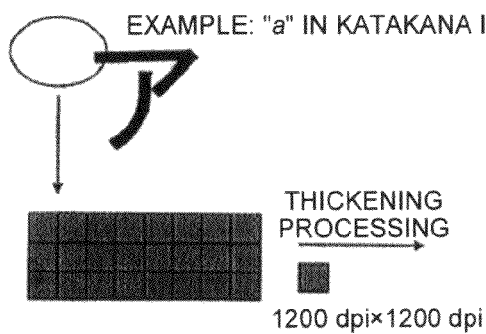
THICKENING PROCESSING →
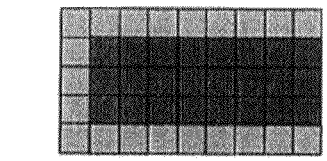
1200 dpi×1200 dpi
DEFAULT:
ALL BINARY BLACK
DIAGRAM2
THICKENED BY MAKING PORTION
ADJACENT TO EDGE PORTION INTO
HALFTONE
FIG.17B
DIAGRAM 1
(a) DIAGRAM 2
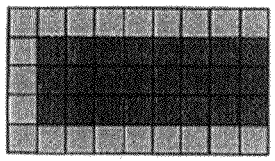
→
  ■ 2400 dpi×2400 dpi
(b)
CONVERSION INTO
HIGHER RESOLUTION
+
EDGE ENHANCEMENT
PROCESSING
HIGHER LIGHT
EMITTING
POWER THAN
BINARY
WRITING
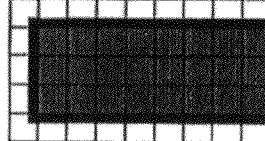  ■ 4800 dpi×4800 dpi

IMAGE FORMING APPARATUS AND IMAGE FORMING METHOD

CROSS-REFERENCE TO RELATED APPLICATIONS

The present application claims priority to and incorporates by reference the entire contents of Japanese Patent Application No. 2013-097055 filed in Japan on May 2, 2013.

BACKGROUND OF THE INVENTION

1. Field of the Invention

The present invention relates to an image forming apparatus and an image forming method.

2. Description of the Related Art

Conventionally, a technique of forming an image by irradiating light from a light source to an image carrier has been known (for example, Japanese Laid-open Patent Publication No. 2005-156380 and Japanese Patent No. 4067771).

For the technique disclosed in Japanese Laid-open Patent Publication No. 2005-156380 and Japanese Patent No. 4067771, there has been a demand for improvement in image quality while suppressing throughput reduction.

SUMMARY OF THE INVENTION

It is an object of the present invention to at least partially solve the problems in the conventional technology.

An image forming apparatus forms an image by irradiating light from a light source to an image carrier. The image forming apparatus includes: an image processing unit that processes image data at resolution N; and a control unit that generates modulation data to drive the light source at resolution m×N (m is a positive integer equal to or larger than 2), which is higher than the resolution N, based on the processed image data. Processing at the image processing unit is pseudo-halftone processing to perform line thinning or thickening on a part of the image data. The control unit converts the image data at the resolution N that has been subjected to the pseudo-halftone processing into data at the resolution m×N, and adjusts an amount of light for a part of the image data based on the resolution m×N.

An image forming method forms an image by irradiating light from a light source to an image carrier. The image forming method includes: processing image data at resolution N; and generating modulation data to drive the light source at resolution m×N (m is a positive integer equal to or larger than 2) based on the processed image data. Pseudo-halftone processing to perform line thinning or thickening on a part of the image data is performed at the processing. The image data at the resolution N that has been subjected to the pseudo-halftone processing is converted into data at the resolution m×N, and an amount of light for the part of the image data is adjusted based on the resolution m×N at the generating.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9A is an explanatory diagram of a line thinning processing;

FIG. 9B is an explanatory diagram of conversion into higher resolution and an edge enhancement processing that are performed after the line thinning processing;

FIG. 10A to FIG. 10C are diagrams of specific examples (part 1 to part 3) of a dot concentration processing, respectively;

FIG. 12 is a diagram showing various optical wave forms at (A) to (C) and showing static energy distributions on a photosensitive drum corresponding to the respective optical waveforms at (D);

FIG. 16A and FIG. 16B are diagrams showing distributions of toner adhesion amount in comparative examples 1 and 2, respectively;

FIG. 16C is a diagram showing a distribution of toner adhesion amount in the present embodiment;

FIG. 17A is an explanatory diagram of a thickening processing; and

FIG. 17B is an explanatory diagram of conversion into higher resolution and an edge enhancement processing that are performed after the thickening processing.

DETAILED DESCRIPTION OF THE PREFERRED EMBODIMENTS

Figure 1:
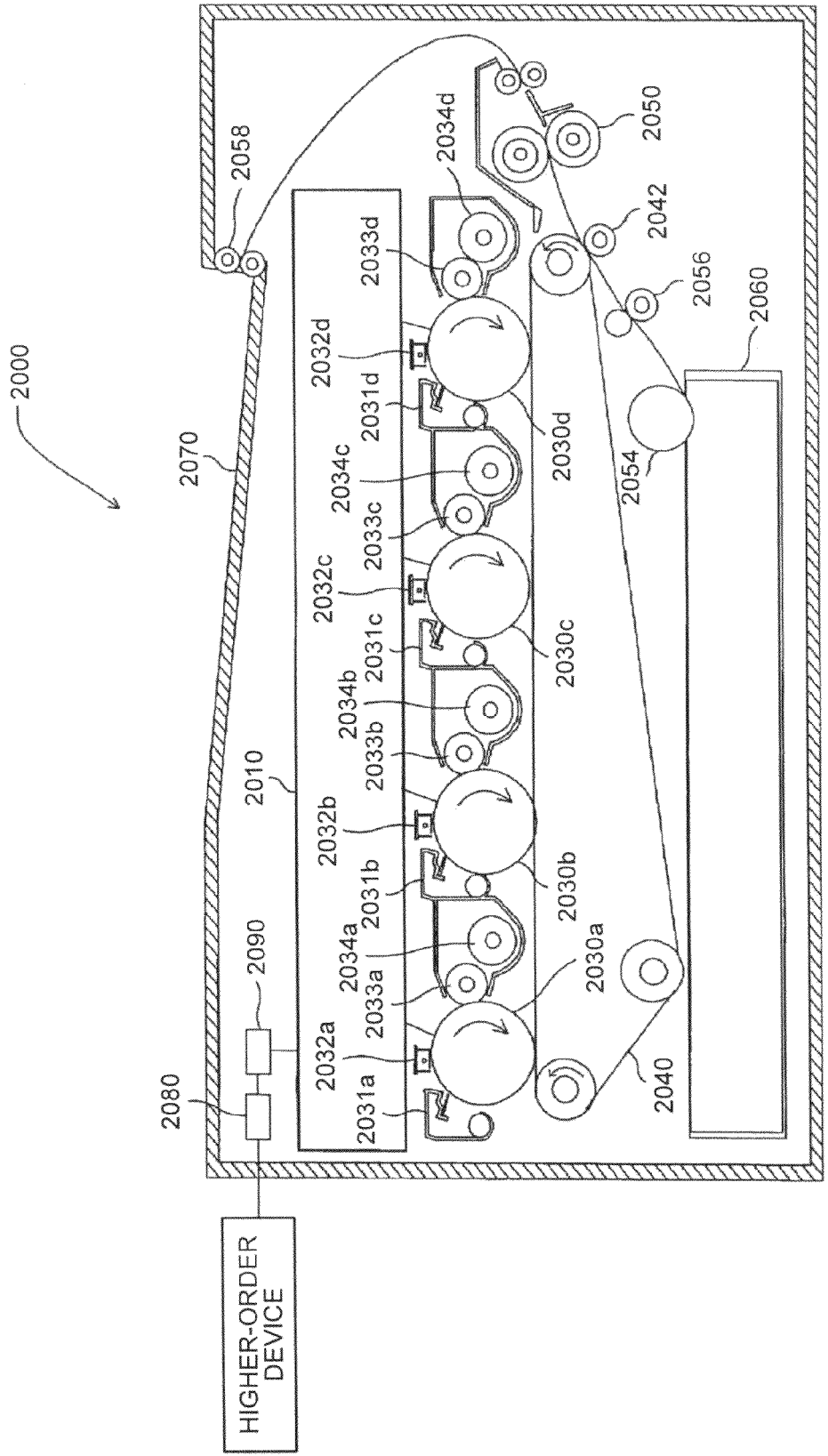
FIG. 1 is a diagram for explaining a schematic configuration of a color printer according to an embodiment of the present invention.

A first embodiment of the present invention is explained below. FIG. 1 illustrates a schematic configuration of a color printer 2000 as an image forming apparatus according to the first embodiment.

This color printer 2000 is a tandem-system multi-color printer that forms a full-color image by superimposing four colors (black, cyan, magenta, and yellow), and includes an optical scanning device 2010, four photosensitive drums (2030a, 2030b, 2030c, 2030d), four cleaning units (2031a, 2031b, 2031c, 2031d), four charge devices (2032a, 2032b, 2032c, 2032d), four developing rollers (2033a, 2033b, 2033c, 2033d), four toner cartridges (2034a, 2034b, 2034c, 2034d), a transfer belt 2040, a transfer roller 2042, a fixing roller 2050, a sheet feeding roller 2054, a registration roller 2056, a sheet discharging roller 2058, a sheet feeding tray 2060, a sheet discharging tray 2070, a communication control device 2080, a density detector 2245, eight home position sensors (2246a,

2246b, 2246c, 2246d, 2247a, 2247b, 2247c, 2247d), and a printer control device 2090 that generally controls the above respective components.

The communication control device 2080 controls interactive communication with a higher-order device (for example, a personal computer) through a network or the like.

The printer control device 2090 includes a central processing apparatus (CPU), a read-only memory (ROM) in which a program that are described in a code readable by the CPU and various kinds of data that are used when the program is executed, a random access memory (RAM) that is a memory for operation, and an analog-to-digital (A/D) converter circuit that converts analog data to digital data. The printer control device 2090 controls the respective components according to a request from a higher-order device, and transmits image data from a higher-order device to the optical scanning device 2010.

The photosensitive drum 2030a, the charge device 2032a, the developing roller 2033a, the toner cartridge 2034a, and the cleaning unit 2031a are used in a group, and forms an image forming station that forms black images (hereinafter, "K station" for convenience sake).

The photosensitive drum 2030b, the charge device 2032b, the developing roller 2033b, the toner cartridge 2034b, and the cleaning unit 2031b are used in a group, and forms an image forming station that forms cyan images (hereinafter, "C station" for convenience sake).

The photosensitive drum 2030c, the charge device 2032c, the developing roller 2033c, the toner cartridge 2034c, and the cleaning unit 2031c are used in a group, and forms an image forming station that forms magenta images (hereinafter, "M station" for convenience sake).

The photosensitive drum 2030d, the charge device 2032d, the developing roller 2033d, the toner cartridge 2034d, and the cleaning unit 2031d are used in a group, and forms an image forming station that forms yellow images (hereinafter, "Y station" for convenience sake).

Each of the photosensitive drums has a photosensitive layer on a surface thereof. That is, the surface of each of the photosensitive drums is a surface to be scanned. Each of the photosensitive drums is rotated by a not shown rotating mechanism in a direction of an arrow in the plane of FIG. 1.

In the explanation herein, in a three-dimensional orthogonal coordinate system, a direction along a direction of length of each of the photosensitive drums is a Y-axis direction, and a direction along a direction of alignment of the four photosensitive drums is an X-axis direction.

Each of the charge devices uniformly charges surfaces of the corresponding photosensitive drum.

The optical scanning device 2010 irradiates beams that are modulated for respective colors to the charged surfaces of the corresponding photosensitive drums based on multi-color image information (black image information, cyan image information, magenta image information, yellow image information) from a higher-order device. Thus, on the surfaces of the respective photosensitive drums, only a part on which light is irradiated loses an electric charge, and latent images corresponding to the image information are formed on the surfaces of the respective photosensitive drums. The latent images formed herein moves toward a direction of the corresponding developing rollers with rotation of the photosensitive drums. A configuration of the optical scanning device 2010 is described later.

On each of the photosensitive drums, an area in which image information is written is called an "effective scanning area", an "image forming area", an "effective image area", or the like.

In the toner cartridge 2034a, black toner is stored, and the toner is supplied to the developing roller 2033a. In the toner cartridge 2034b, cyan toner is stored, and the toner is supplied to the developing roller 2033b. In the toner cartridge 2034c, magenta toner is stored, and the toner is supplied to the developing roller 2033c. In the toner cartridge 2034d, yellow toner is stored, and the toner is supplied to the developing roller 2033d.

To each of the developing rollers, toner from a corresponding toner cartridge is thinly and uniformly applied on the surface with rotation. When the toner on the surface of each of the developing rollers touches the surface of the corresponding photosensitive drum, the toner is transferred only to the part of the surface on which light has been irradiated, and adheres thereto. That is, each of the developing rollers makes toner adhere to a latent image formed on the surface of the corresponding photosensitive drum to make the image appear. The image (toner image) to which toner has adhered moves in a direction toward the transfer belt 2040 with rotation of the photosensitive drum.

The respective toner images of yellow, magenta, cyan, and black are sequentially transferred onto the transfer belt 2040 at predetermined timing to be superimposed, to form a color image.

In the sheet feeding tray 2060, recording sheets are stored. The sheet feeding roller 2054 is arranged near the sheet feeding tray 2060, and the sheet feeding roller 2054 takes out the recording sheets one by one from the sheet feeding tray 2060, and conveys to the registration roller pair 2056. The registration roller pair 2054 sends the recording sheet into a gap between the transfer belt 2040 and the transfer roller 2042 at predetermined timing. Thus, the color image on the transfer belt 2040 is transferred onto the recording sheet. The recording sheet to which the image has been transferred is sent to the fixing roller 2050.

At the fixing roller 2050, heat and pressure are applied to the recording sheet, and thus the toner is fixed onto the recording sheet. The recording sheet thus subjected to fixing is sent to the sheet discharging tray 2070 through the sheet discharging roller 2058, and is sequentially stacked on the sheet discharging tray 2070.

Each of the cleaning units removes toner (residual toner) remaining on the surface of the corresponding photosensitive drum. The surface of the photosensitive drum from which the residual toner has been removed returns to a position opposing to the corresponding charge device again.

Figure 2:
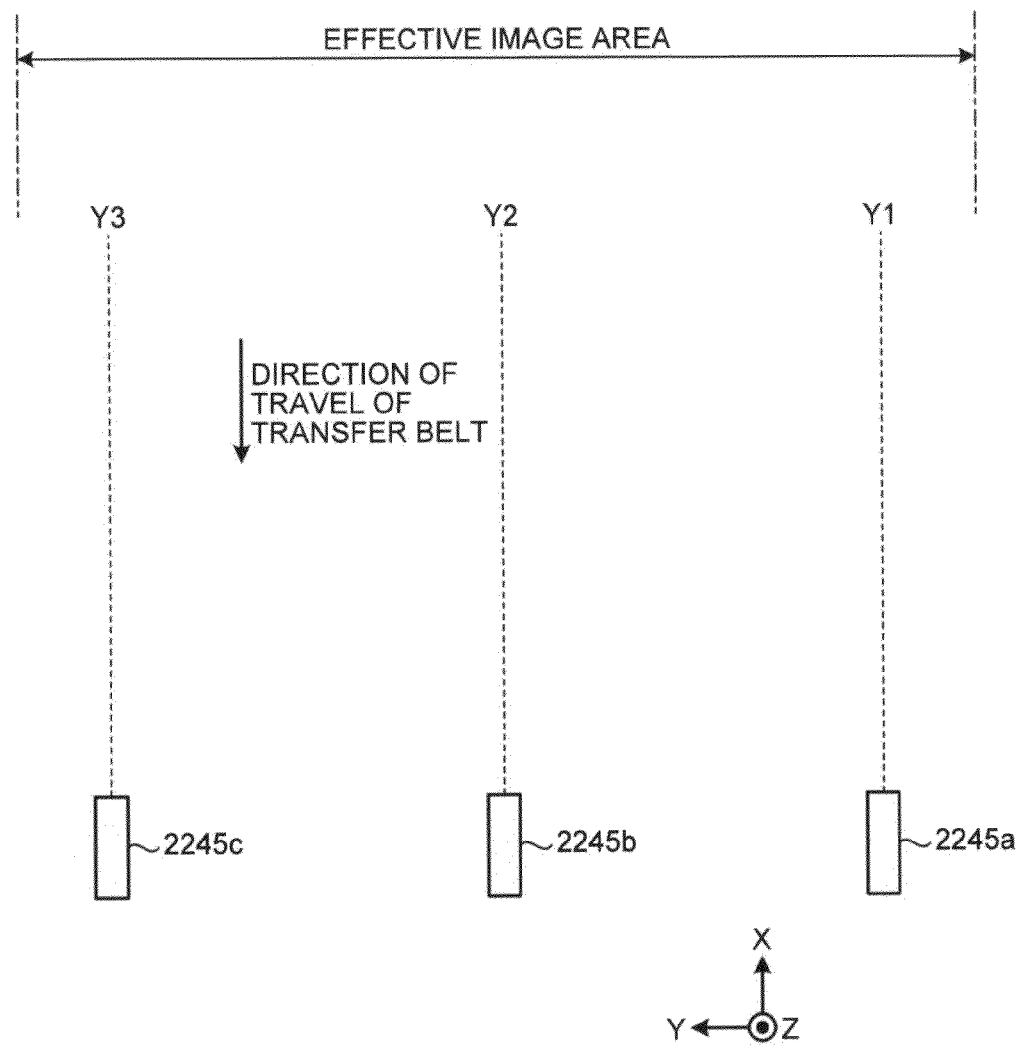
FIG. 2 is an explanatory diagram of an arrangement of three optical sensors.

A density detector 2245 is arranged at a position in the −X direction from the transfer belt 2040. This density detector 2245 has three optical sensors (2245a, 2245b, 2245c) as shown in FIG. 2 as an example.

The optical sensor 2245a is arranged at a position opposing to a portion adjacent to an end of the effective image area on the transfer belt 2040 in the −Y direction, and the optical sensor 2245c is arranged at a position opposing to a portion adjacent to an end of the effective image area in the +Y direction, and the optical sensor 2245b is arranged at an approximately center between the optical sensor 2245a and the optical sensor 2245c with respect to a main-scanning direction. Herein, a center position of the optical sensor 2254a is denoted as Y1, a center position of the optical sensor 2254b is denoted as Y2, and a center position of the optical sensor 2254c is denoted as Y3 with respect to the main-scanning direction (Y-axis direction).

Figure 3:
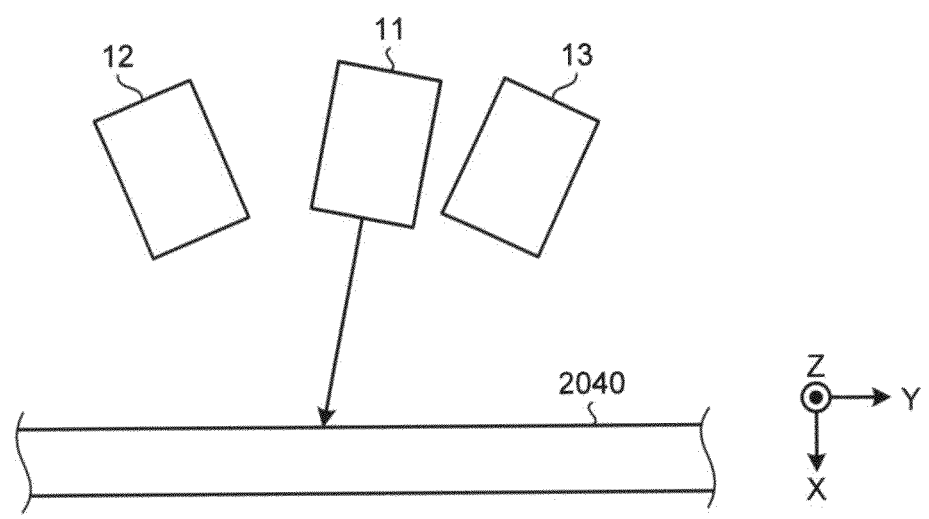
FIG. 3 is an explanatory diagram of a configuration of the optical sensor.
Figure 4:
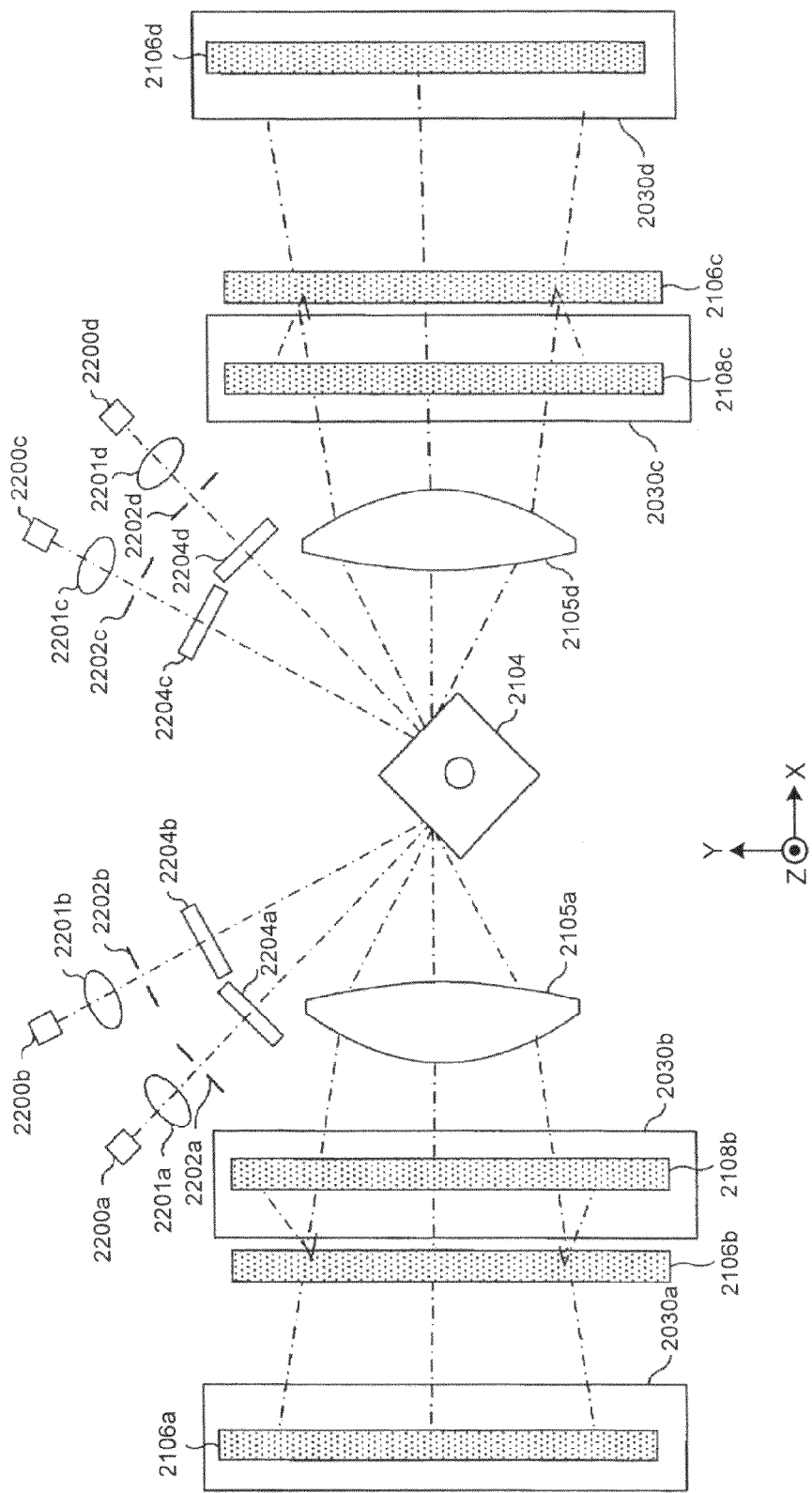
FIG. 4 is diagram (1) for explaining an optical scanning device shown in FIG. 1.
Figure 5:
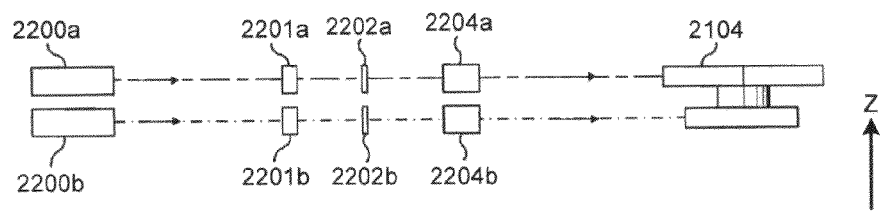
FIG. 5 is diagram (2) for explaining the optical scanning device.
Figure 6:
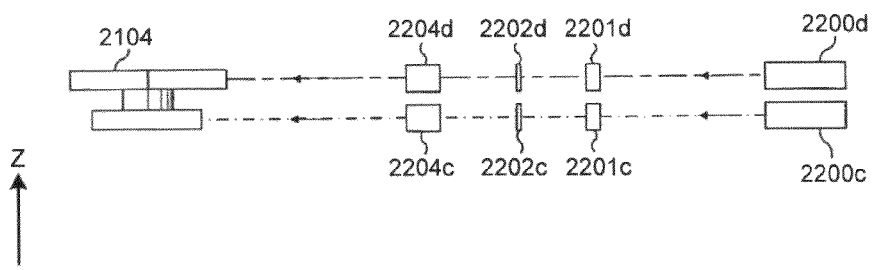
FIG. 6 is diagram (3) for explaining the optical scanning device.
Figure 7:
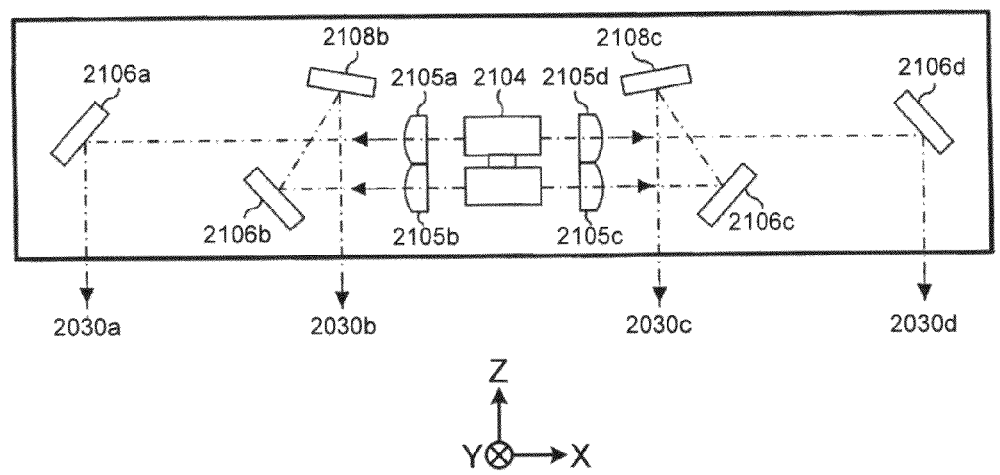
FIG. 7 is diagram (4) for explaining the optical scanning device.

Each of the optical sensors has a light-emitting diode (LED) 11 that emits light (hereinafter, described also as "detection light") toward the transfer belt 2040, a specular-reflection light-receiving element 12 that receives specular reflection light from the transfer belt 2040 or a toner pad on the transfer belt 2040, a diffused-reflection-light receiving element 13 that receives diffused reflection light from the transfer belt 2040 or a toner pad on the transfer belt 2040 as shown in FIG. 3 as an example. Each of the light receiving elements outputs a signal (photoelectric conversion signal) according to an amount of received light.

The home position sensor 2246a detects a home position in rotation of the photosensitive drum 2030a.

The home position sensor 2246b detects a home position in rotation of the photosensitive drum 2030b.

The home position sensor 2246c detects a home position in rotation of the photosensitive drum 2030c.

The home position sensor 2246d detects a home position in rotation of the photosensitive drum 2030d.

Next, a configuration of the optical scanning device 2010 is explained.

Figure 8:
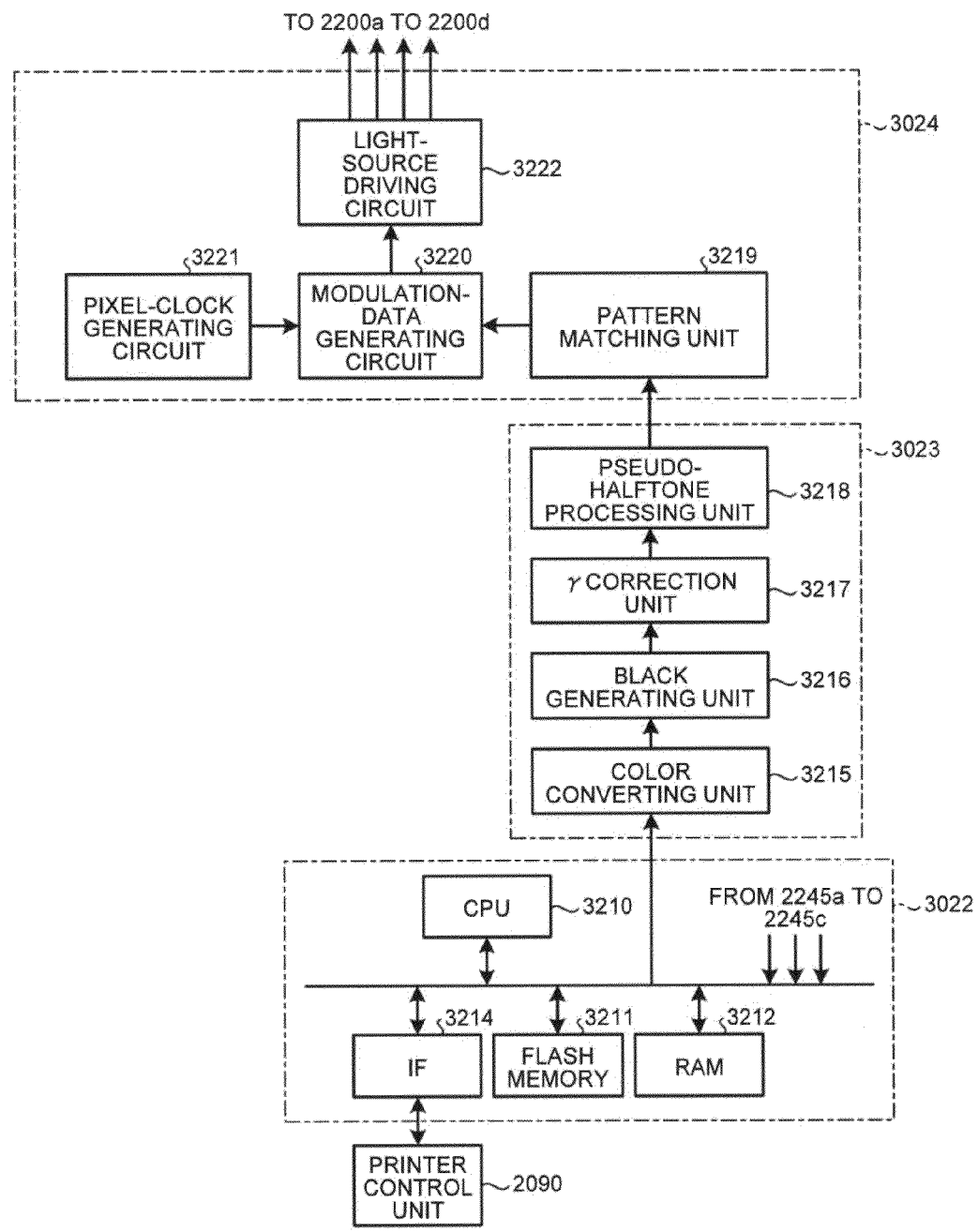
FIG. 8 is a block diagram of a configuration to control the color printer.

The optical scanning device 2010 includes four light sources (2200a, 2200b, 2200c, 2200d), four coupling lenses (2201a, 2201b, 2201c, 2201d), four units of opening plates (2202a, 2202b, 2202c, 2202d), four cylindrical lenses (2204a, 2204b, 2204c, 2204d), a polygon mirror 2104, four scanning lenses (2105a, 2105b, 2105c, 2105d), six folding mirrors (2106a, 2106b, 2106c, 2106d, 2108b, 2108c), an interface unit 3022, an image processing unit 3023, and a light-source control unit 3024 (illustration omitted in FIG. 4 to FIG. 7, refer to FIG. 8). These components are assembled at predetermined positions in an optical housing (not shown).

Each of the e light sources includes a surface-emitting laser array in which multiple emitting units (vertical cavity surface emitting laser: VCSEL) are two-dimensionally arranged. The light emitting units of the surface-emitting laser array are arranged such that the intervals between the light emitting units are equal when all of the light emitting units orthogonally are projected on a virtual line that extends in a sub-scanning direction corresponding to a sub-scanning direction. In the present specification, the "interval between the light emitting units" indicates a distance between centers of two light emitting units.

The coupling lens 2201a is arranged on an optical path of the beam emitted from the light source 2200a, and converts the beam into an approximately parallel beam.

The coupling lens 2201b is arranged on an optical path of the beam emitted from the light source 2200b, and converts the beam into an approximately parallel beam.

The coupling lens 2201c is arranged on an optical path of the beam emitted from the light source 2200c, and converts the beam into an approximately parallel beam.

The coupling lens 2201d is arranged on an optical path of the beam emitted from the light source 2200d, and converts the beam into an approximately parallel beam.

The opening plate 2202a has an opening, and shapes the beam that has passed through the coupling lens 2201a.

The opening plate 2202b has an opening, and shapes the beam that has passed through the coupling lens 2201b.

The opening plate 2202c has an opening, and shapes the beam that has passed through the coupling lens 2201c.

The opening plate 2202d has an opening, and shapes the beam that has passed through the coupling lens 2201d.

The cylindrical lens 2204a focuses the beam that has passed through the opening of the opening plate 2202a on a position near a deflective reflection surface of the polygon mirror 2104 relative in a Z-axis direction.

The cylindrical lens 2204b focuses the beam that has passed through the opening of the opening plate 2202b on a position near a deflective reflection surface of the polygon mirror 2104 in the Z-axis direction.

The cylindrical lens 2204c focuses the beam that has passed through the opening of the opening plate 2202c on a position near a deflective reflection surface of the polygon mirror 2104 in the Z-axis direction.

The cylindrical lens 2204d focuses the beam that has passed through the opening of the opening plate 2202d on a position near a deflective reflection surface of the polygon mirror 2104 in the Z-axis direction.

An optical system constituted of the coupling lens 2201a, the opening plate 2202a, and the cylindrical lens 2204a is a pre-deflector optical system of the K station.

An optical system constituted of the coupling lens 2201b, the opening plate 2202b, and the cylindrical lens 2204b is a pre-deflector optical system of the C station.

An optical system constituted of the coupling lens 2201c, the opening plate 2202c, and the cylindrical lens 2204c is a pre-deflector optical system of the M station.

An optical system constituted of the coupling lens 2201d, the opening plate 2202d, and the cylindrical lens 2204d is a pre-deflector optical system of the Y station.

The polygon mirror 2104 has a four-sided mirror having a two-stage structure that rotates about an axis parallel to the Z axis, and each mirror functions as a deflective reflection surface. It is arranged such that each of the beam from the cylindrical lens 2204b and the beam from the cylindrical lens 2204c is deflected by the four-sided mirror at a first stage (lower stage), and each of the beam from the cylindrical lens 2204a and the beam from the cylindrical lens 2204d is deflected by the four-sided mirror at a second stage (upper stage).

Moreover, each of the beams from the cylindrical lens 2204a and the cylindrical lens 2204b is deflected in the −X direction from the polygon mirror 2104A, and each of the beams from the cylindrical lens 2204c and the cylindrical lens 2204d is deflected in the +X direction from the polygon mirror 2104.

Each of the scanning lenses has an optical power to focus beams on a position near a corresponding photosensitive drum, and an optical power that causes a light spot to move in the main-scanning direction at a constant speed on a surface of a corresponding photosensitive drum with rotation of the polygon mirror 2104.

The scanning lens 2105a and the scanning lens 2105b are arranged at a position in the −X direction from the polygon mirror 2104, and the scanning lens 2105c and the scanning lens 2105d are arranged at a position in the +X direction from the polygon mirror 2104.

The scanning lens 2105a and the scanning lens 2105b are layered in the Z-axis direction, and the scanning lens 2105b is opposed to the four-sided mirror at the first stage, and the scanning lens 2105a is opposed to the four-sided mirror at the second stage. Furthermore, the scanning lens 2105c and the scanning lens 2105d are layered in the Z-axis direction, and the scanning lens 2105c is opposed to the four-sided mirror at the first stage, and the scanning lens 2105d is opposed to the four-sided mirror at the second stage.

The beam from the cylindrical lens 2204a deflected by the polygon mirror 2104 is irradiated to the photosensitive drum 2030a through the scanning lens 2105a and the folding mirror 2106a, to form a light spot. This light spot moves in the direction of length of the photosensitive drum 2030a with rotation of the polygon mirror 2104, that is, scans on the photosensitive drum 2030a. The direction of movement of this light spot is the "main-scanning direction" at the photosensitive drum 2030a, and the direction of rotation of the photosensitive drum 2030a is the "sub-scanning direction" at the photosensitive drum 2030a.

Moreover, the beam from the cylindrical lens 2204b deflected by the polygon mirror 2104 is irradiated to the photosensitive drum 2030b through the scanning lens 2105b, the folding mirror 2106b, and the folding mirror 2108b, to form a light spot. This light spot moves in the direction of length of the photosensitive drum 2030b with rotation of the polygon mirror 2104, that is, scans on the photosensitive drum 2030b. The direction of movement of this light spot is the "main-scanning direction" at the photosensitive drum 2030b, and the direction of rotation of the photosensitive drum 2030b is the "sub-scanning direction" at the photosensitive drum 2030b.

Furthermore, the beam from the cylindrical lens 2204c deflected by the polygon mirror 2104 is irradiated to the photosensitive drum 2030c through the scanning lens 2105c, the folding mirror 2106c, and the folding mirror 2108c, to form a light spot. This light spot moves in the direction of length of the photosensitive drum 2030c with rotation of the polygon mirror 2104, that is, scans on the photosensitive drum 2030c. The direction of movement of this light spot is the "main-scanning direction" at the photosensitive drum 2030c, and the direction of rotation of the photosensitive drum 2030c is the "sub-scanning direction" at the photosensitive drum 2030c.

Moreover, the beam from the cylindrical lens 2204d deflected by the polygon mirror 2104 is irradiated to the photosensitive drum 2030d through the scanning lens 2105d and the folding mirror 2106d, to form a light spot. This light spot moves in the direction of length of the photosensitive drum 2030d with rotation of the polygon mirror 2104, that is, scans on the photosensitive drum 2030d. The direction of movement of this light spot is the "main-scanning direction" at the photosensitive drum 2030d, and the direction of rotation of the photosensitive drum 2030d is the "sub-scanning direction" at the photosensitive drum 2030d.

The respective folding mirrors are arranged such that the respective optical path lengths to the respective photosensitive drums from the polygon mirror are equal to each other, and such that incident positions and incident angles of beams at the respective photosensitive drums are equal to each other.

The optical system arranged on the optical path between the polygon mirror 2104 and each of the photosensitive drums is also called a scanning optical system. In this example, the scanning optical system of the K station is constituted of the scanning lens 2105a and the folding mirror 2106a. Moreover, the scanning optical system of the C station is constituted of the scanning lens 2105b and two pieces of the folding mirrors (2106b, 2108b). Further, the scanning optical system of the M station is constituted of the scanning lens 2105c and two pieces of the folding mirrors (2106c, 2108c). Furthermore, the scanning optical system of the Y station is constituted of the scanning lens 2105d and the folding mirror 2106d. In each of the scanning optical systems, the scanning lens may include more than one lens.

The interface unit 3022 includes a CPU 3210, a flash memory 3211, a RAM 3212, and an interface (IF) 3214 as shown in FIG. 8 as an example. Arrows shown in FIG. 8 are to indicate representative flow of signals and data, and are not to express all connection relationships between the respective blocks.

The IF 3214 is a communication interface that controls interactive communication with the printer control device 2090. Image data from a higher-order device is supplied to the IF 3214 through the communication control device 2080 and the printer control device 2090 (hereinafter, also described together as "the printer control device 2090 and the like").

In the flash memory 3211, various kinds of programs that are described in a code readable by the CPU 3210 and various kinds of data that is required for execution of the programs are stored.

The RAM 3212 is a memory for operation.

The CPU 3210 operates according to a program stored in the flash memory 3211, and controls the entire optical scanning device 2010.

The image processing unit 3023 includes a color converting unit 3215, a black generating unit 3216, a γ correction unit 3217, and a pseudo-halftone processing unit 218.

The color converting unit 3215 converts an expression mode of image data received from the interface unit 3022 that is expressed in RGB into CMY reproducible in the color printer 2000.

The black generating unit 3216 extracts black components from the image data that has been converted into CMY, determines CMY colors thereafter, and finally performs conversion into CMYK.

The γ correction unit 3217 performs, on the image data that has been subjected to conversion into CMYK, tone correction according to output characteristics of the color printer 2000 for each of CMYK.

The pseudo-halftone processing unit 3218 performs pseudo-halftone processing for each of CMYK on the image data that has been subjected to the tone correction for each of CMYK, and transmits to the light-source control unit 3024. The "pseudo-halftone processing" is a processing in which the number of the pixels and the degree of gathering of the pixels are controlled to express tones using only pixels of two colors, black and white. Specifically, examples of the pseudo-halftone processing include dither processing and density pattern processing.

The light-source control unit 3024 includes a pixel-clock generating circuit 3221, a modulation-data generating circuit 3220, a light-source driving circuit 3222, and a pattern matching unit 3219.

The pixel-clock generating circuit 3221 generates a pixel clock signal. The pixel clock signal can be phase-modulated at the resolution of 1/8 clock, for example.

The modulation-data generating circuit 3220 determines write start timing based on an output signal of a not shown synchronization detecting sensor for each of the image forming stations. Dot data at each of the light emitting units is superimposed with the pixel clock signal from the pixel-clock generating circuit 3221, and modulation data that is independent for each respective light emitting unit is generated based on information from the image processing unit 3023 or the like.

The light-source driving circuit 3222 outputs a driving signal for the respective light emitting units to the respective light sources according to the respective modulation data from the modulation-data generating circuit 3220. The pattern matching unit 3219 is described in detail later.

As can be seen from the explanation above, in the color printer 2000, two-stage image processing with the image processing at the image processing unit 3023 and the image processing at the modulation-data generating circuit 3220 in the light-source control unit 3024 is performed.

To the image processing unit 3023, 8-bit character data at resolution N (for example, 1200 dots per inch (dpi)) is transferred from a higher-order device (for example, a personal computer) with resolution N (for example, 1200 dpi) through the printer control device 2090 and the like.

The image processing unit 3023 detects a character to be processed, by filter, pattern matching, or the like from the transferred data. The character to be processed may be either a solid black character or an outline character.

In the color printer 2000, a surface-emitting laser array having multiple surface emitting lasers that enable high density writing is used as a light source, and the light-source control unit 3024 includes the modulation-data generating circuit 3220.

The modulation-data generating circuit 3220 makes the character data from the image processing unit 3023 into higher resolution data, and generates a modulation signal based on the higher resolution character data.

Specifically, the modulation-data generating circuit 3220 converts the resolution of the character data from N (for example, 1200 dpi) to m×N (for example, 4×1200 dpi=4800 dpi), and generates modulation data that includes a modulation signal for a pulse amplitude, a pulse width, and/or the like that correspond to pixels forming the character or pixels around the character in units of 4800 dpi. Thus, reproducibility of small solid black characters or outline characters can also be improved. At this time, because only characters are subjected to the image processing (correction), it is preferable that object information (attribute information) indicating that it is a character be transferred therewith when image data is transferred to the light-source control unit 3024.

Such processing may be performed on, for example, a line. Diagram 1 and diagram 2 in FIG. 9A illustrate states before and after a line thinning processing. When the pseudo-halftone processing is performed on a character "a" in katakana in a point size of 6 in which all pixels have a uniform tone (character data in which all pixels have a uniform tone), the image data is normally transferred as it is to the light-source control unit 3024 (hereinafter, also called engine unit) without performing any processing for a portion circled in the figure.

However, even if 3-dot line data of 1200 dpi in which all pixels have a uniform tone, shown in diagram 1 in FIG. 9A is sent to the engine unit, when the engine unit has a configuration of outputting sharper images (when the resolution at the engine unit is higher), although a line having a line width of 63.75 micron (=21.25 micron×3) is to be formed on a recording sheet, the line may be formed thicker (for example, in 80 micron) than that in actuality.

In such a case, it is preferable that the 3-dot line data be converted into data subjected to the line thinning processing in advance at the image processing unit 3023. Specifically, by reducing an optical power for an edge portion to make the edge portion in a 3-dot line into halftone data, line thinning of the 3-dot line can be achieved (refer to diagram 2 in FIG. 9A).

However, in this case, although the line thinning is achieved, the edge portion is recorded in halftone. When a lower optical energy than that when recorded with the light emitting units caused to emit at full power is used, the edge portion is to be recorded in gray that cannot be determined white or black. In this case, an optical energy region of an intermediate level increases, thereby increasing a region unstable for image forming. As a result, a line is made fuzzy, discontinuous, or unclear (sharpness is degraded).

Therefore, in the present embodiment, character data from the image processing unit 3023 is converted at the light-source control unit 3024 into data with higher resolution m×N (m is a positive integer equal to or larger than 2) than resolution N (conversion into high-resolution data), and the edge enhancement processing is performed on the character data with resolution m×N.

As an example, resolution N at which the image processing is performed in the image processing unit 3023 is 1200 dpi, and the resolution to which data is converted in the light-source control unit 3024 is 4800 dpi, and data transfer from the image processing unit 3023 to the light-source control unit 3024 is performed in 2 bits at 1200 dpi.

Diagram 1 and diagram 2 in FIG. 9A illustrate states before and after conversion into higher resolution and the edge enhancement processing. In this example, 3-dot line data with resolution of 1200 dpi is processed, and an edge portion that is processed into halftone data by the line thinning processing is shown in light gray (refer to diagram 1 in FIG. 9B).

Subsequently, the pattern matching unit 3219 in the light-source control unit 3024 detects the edge portion of the 3-dot line data that has been subjected to the image processing in the image processing unit 3023. The light-source control unit 3024 can perform writing at 4800 dpi, and can change a driving signal (modulation signal) of the surface emitting laser in units of 4800 dpi. The light-source control unit 3024 performs a dot concentration processing to bring the edge portion toward a center portion (a thin line portion in dark gray), and use higher optical power (for example, twice as much as normal power) than normal power (power used when writing in solid black) to write the edge portion. Thus, the edge enhancement processing is performed.

In diagram 2(*a*) in FIG. 9B, an example in which an edge portion of 2 dots is enhanced at 4800 dpi is shown, and in diagram 2(*b*) in FIG. 9B, an example in which an edge portion of 1 dot is enhanced at 4800 dpi is shown. As described, by processing an edge portion with high power at high resolution, the stable character quality with high reproducibility can be achieved without interfering with line thinning.

In FIG. 10A to FIG. 10C, other examples of the line thinning processing are shown. For example, when 2-dot line data at 1200 dpi that has entirely converted into halftone data shown in diagram 1 in FIG. 10A is received, the light-source control unit 3024 converts the data into higher resolution data, and performs the edge enhancement processing on the data converted into higher-resolution data, to perform conversion into data for optical writing corresponding to 1-dot line (refer to diagram 2 in FIG. 10A). Similarly to the above, it is written with optical power, for example, twice as much as normal power. As a result, an image in which a thin line is further stable and sharp (with higher sharpness) can be obtained.

Moreover, when 1-dot line data at 1200 dpi that has entirely converted into halftone data shown in diagram 1 in FIG. 10B is received, the light-source control unit 3024 converts the data into higher resolution data, and performs the edge enhancement processing on the data converted into higher resolution data, to perform conversion into data for optical writing corresponding to 1-dot line of 2400 dpi (refer to diagram 2 in FIG. 10B). Similarly to the above, it is written with optical power, for example, twice as much as normal power (power used when writing in solid black). As a result, an image in which a thin line is further stable and sharp (with higher sharpness) can be obtained.

Furthermore, when halftone isolated 1-dot data at 1200 dpi shown in diagram 1 in FIG. 10C is received, the light-source control unit 3024 converts the data into higher resolution data, and performs the edge enhancement processing on the data converted into higher resolution data, to perform conversion into data for optical writing corresponding to isolated 1-dot of 2400 dpi (refer to diagram 2 in FIG. 100). Similarly to the above, it is written with optical power, for example, twice as much as normal power (power used when writing in solid black). As a result, an image in which an isolated dot is further stable and sharp (with higher sharpness) can be obtained.

In FIG. 11(A) to FIG. 11(E), specific examples (part 1 to part 5) of pattern matching that is performed in the pattern matching unit 3219 are shown.

In these pattern matching examples, a target pixel is only ones in halftone, and by determining whether four pixels above, below, left and right of the target pixel (center pixel) are white in nine pixels arranged in a 3×3 matrix, the center pixel is converted into a high-powered binary image with higher resolution.

Figure 11:
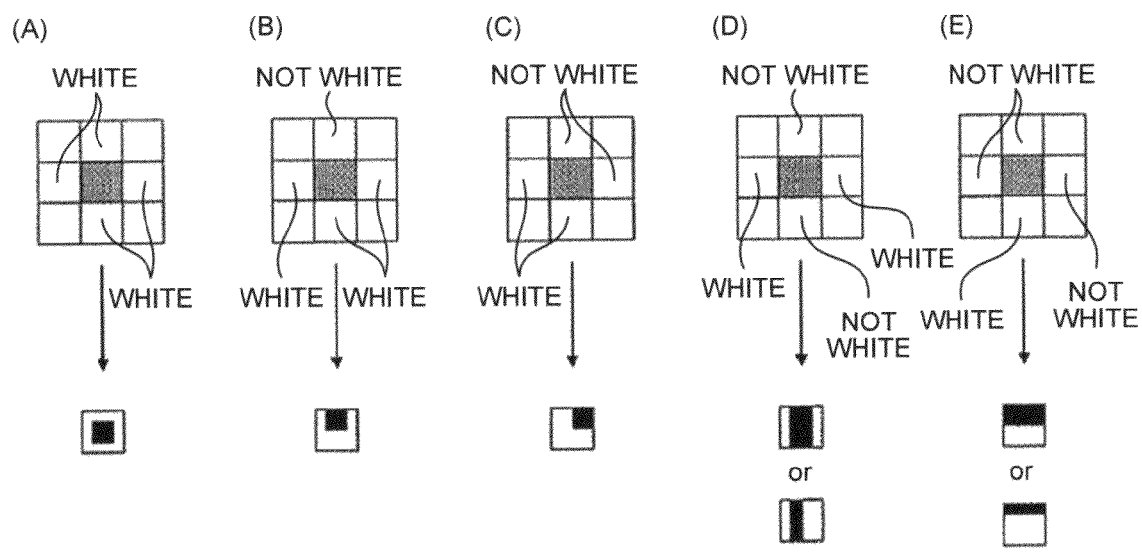
FIG. 11 is an explanatory diagram showing specific examples (part 1 to part 5) of pattern matching at (A) to (E), respectively.

Specifically, when halftone isolated 1-dot data of 1200 dpi is received, the pattern matching unit 3219 performs conversion into high-power isolated 1-dot data of 2400 dpi, to improve reproducibility of the character at development (refer to FIG. 11(A)). Moreover, the pattern matching unit 3219 detects white pixels (WHITE) and non-white pixels (NOT WHITE), and performs the dot concentration processing in which halftone image data is brought toward a more black portion on halftone image data while converting the halftone data into higher resolution data (data at 2400 dpi or 4800 dpi), and further converts the data into data to be written with higher optical power (for example, twice as much as normal power) than normal power (power used when writing in solid black) (refer to FIG. 11(B) to FIG. 11(E)).

Summarizing the processing explained above, as shown in FIG. 9B, detection of an edge portion and weighting of a black region are performed, and as processing, processing of outputting high-power modulation data at high resolution in a dot concentration mode can be achieved. The dot concentration mode indicates such processing that halftone data or isolated black data near a blacker portion is brought toward the blacker portion. Because reproducibility of a toner image varies according to a development process, it is preferable that an optimal power value be selected in advance as an index to increase power.

In FIG. 12(A) to FIG. 12(C), various optical waveforms (part 1 to part 3) are shown. In FIG. 12(D), an electrostatic energy distribution on a surface of a photosensitive drum corresponding to each of the optical wave forms is shown. A solid line in FIG. 12(D) indicates the electrostatic energy distribution corresponding to the optical waveform in FIG. 12(A), a broken line in FIG. 12(D) indicates the electrostatic energy distribution corresponding to the optical waveform in FIG. 12(B), and an alternate long and short dashed line in FIG. 12(D) indicates the electrostatic energy distribution corresponding to the optical waveform in FIG. 12(C).

That is, when halftone data is simply output, for example, although duty is reduced to 50% in normal pulse modulation or power is reduced to 50% in normal power modulation, a region close to a reference level (level to be a reference to determine whether black or white) relating to development increases as a result in either of the cases. Pixels in this region can be white or black and are unstable, thereby making an image unstable, and as a result, can cause deterioration of granularity.

Figure 13:
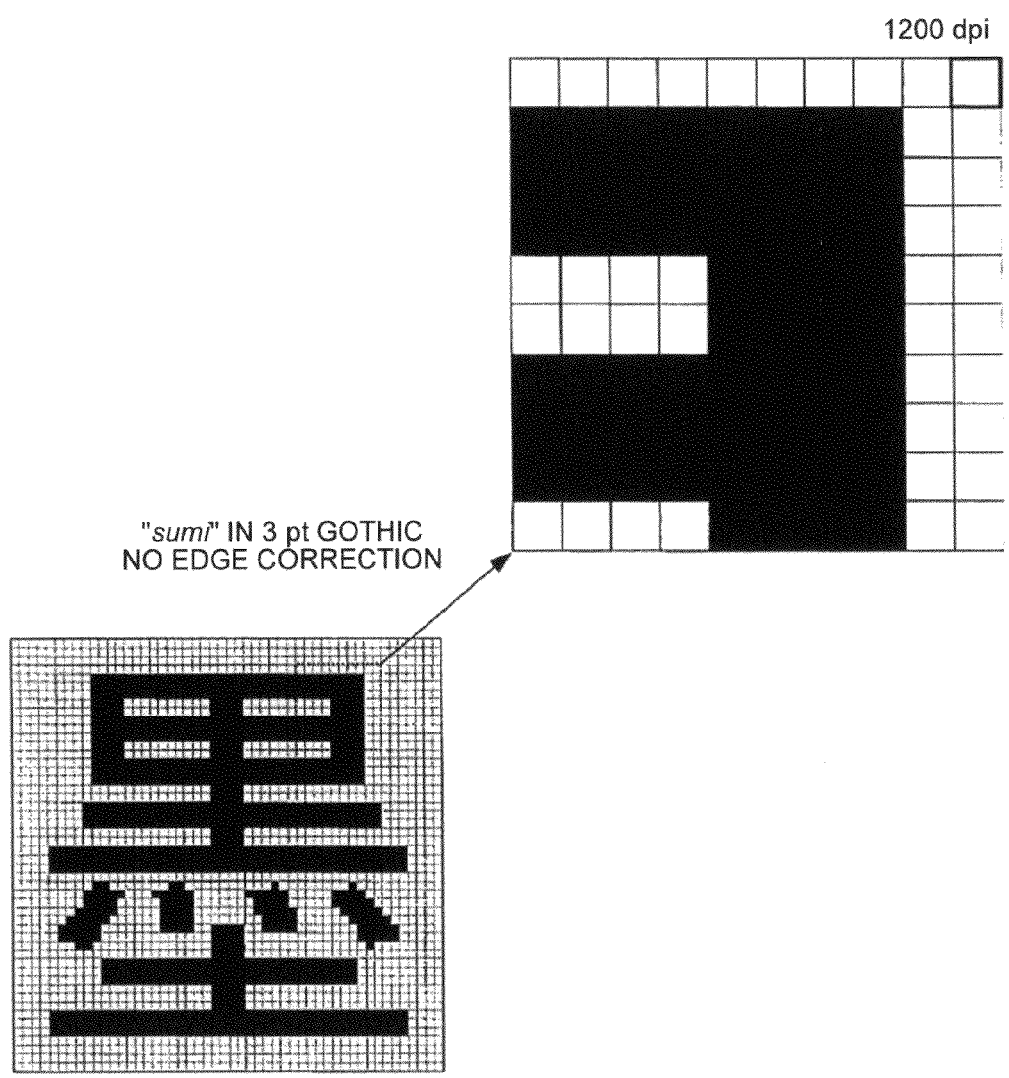
FIG. 13 is an explanatory diagram of character recording in comparative example 1.
Figure 14:
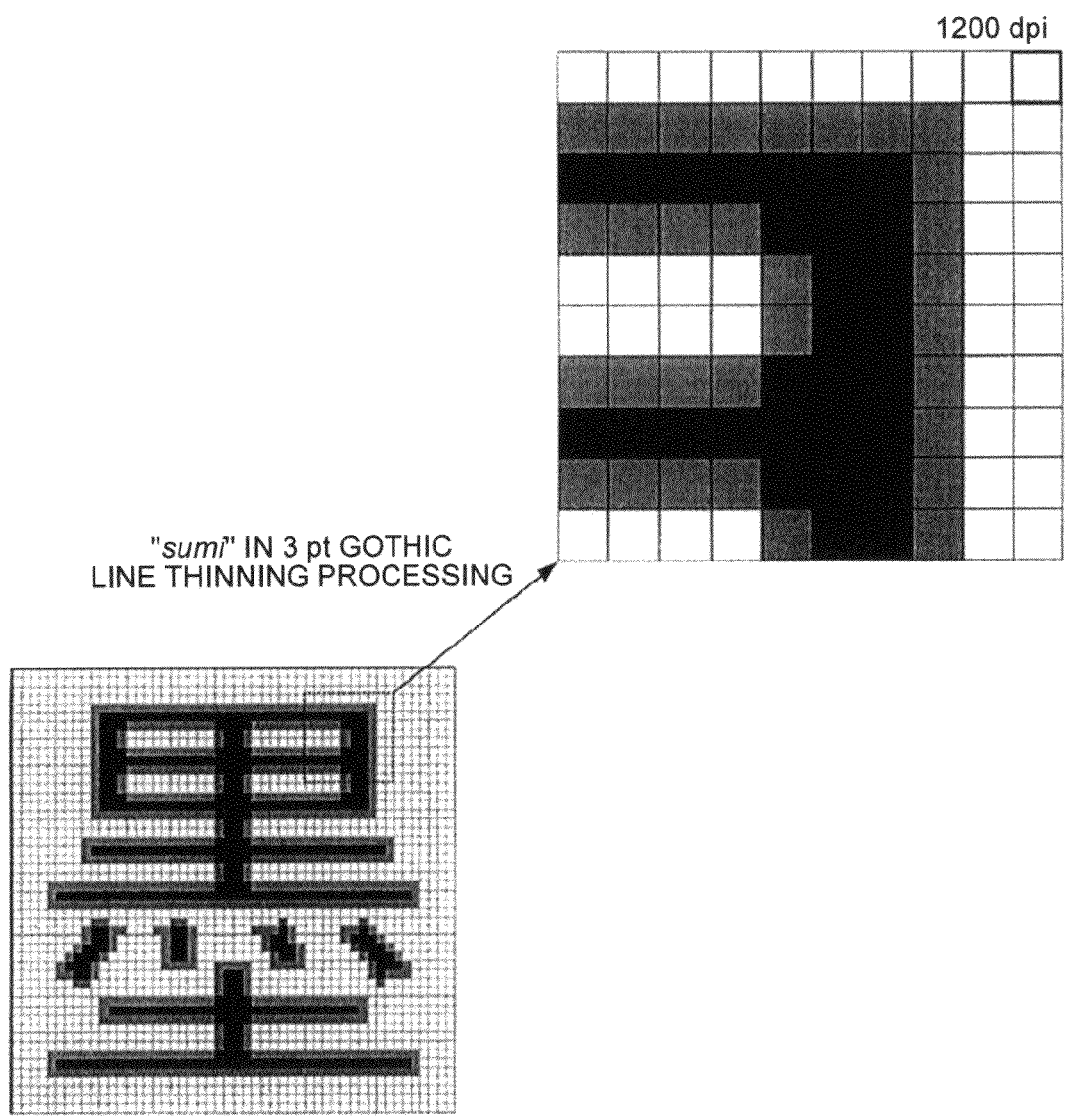
FIG. 14 is an explanatory diagram of character recording in comparative example 2.

In FIG. 13 and FIG. 14, simulation results in recording a character (for example, a kanji "sumi") in comparative examples 1 and 2 are shown, respectively.

In comparative example 1 shown in FIG. 13, character data of an original image is made into a toner image as it is without being subjected to the image processing (edge correction). Lines of the character are thick, and what is shown looks different from the original image.

Thus, if the line thinning processing is performed as shown in comparative example 2 shown in FIG. 14, although the character is expressed in thinner lines, the widths of the lines are nonuniform or are fuzzy if the lines are precisely observed (refer to FIG. 16B).

Figure 15:
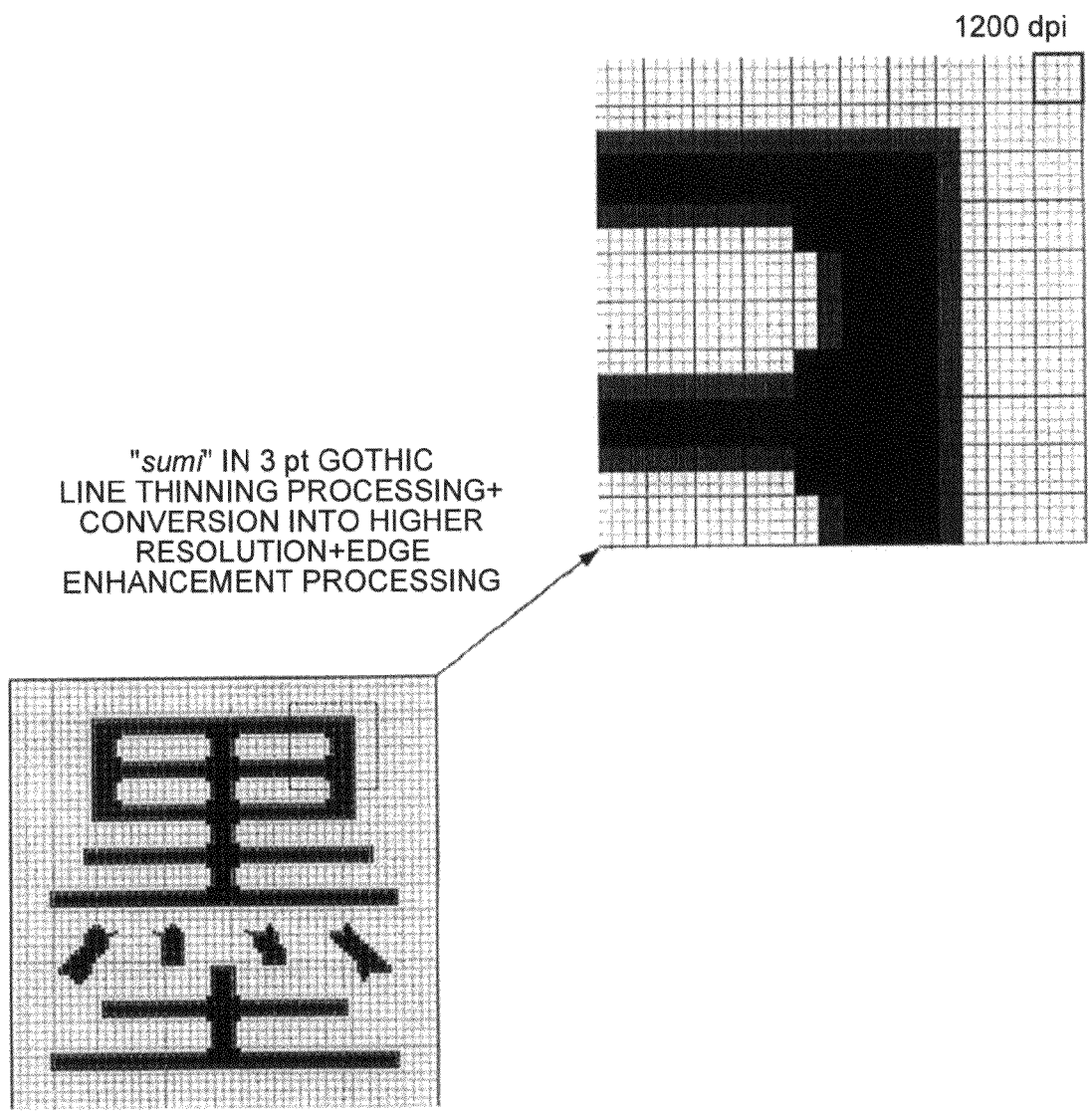
FIG. 15 is an explanatory diagram of character recording in a present embodiment.

In FIG. 15, a simulation result of recording a character (for example, a kanji "sumi") in the present embodiment is shown. In this example, the increase rate of power is, for example, 150% and it is seen that lines of the character are thin and clear. As described, by performing the image processing (the line thinning processing, the conversion into higher resolution, and the edge enhancement processing) described above on character data, non-fuzzy characters that are formed with sharp lines can be formed.

Moreover, in the pattern matching unit 3219, if object information (tag information) indicating, for example, it is a character is received from the image processing unit 3023, because pattern matching is only required to be performed on halftone pixels of character data not all of the pixels, over all time required for the pattern matching can be reduced.

The color printer 2000 according to the present embodiment explained above has the image processing unit 3023 that processes image data (for example, character data) at resolution N (for example 1200 dpi), and the light-source control unit 3024 that generates modulation data to drive the light source at resolution m×N (m is a positive integer equal to or larger than 2) higher than resolution N based on the image data that has been processed.

In this case, image data can be transferred from the image processing unit 3023 to the light-source control unit 3024 at resolution N (at a low data transfer rate, that is, at high speed), and modulation data based on the image data can be generated at resolution m×N higher than resolution N.

As a result, the image quality can be improved while suppressing throughput reduction. Furthermore, because it is not required to speed up the data transfer, cost increase can be avoided.

On the other hand, if image data to be processed at the image processing unit 3023 is data of a large number of bits at, for example, a resolution of 2400 dpi or 4800 dpi to increase flexibility in the image processing, data to be transferred to the light-source control unit 3024 is to be enormous, and therefore, throughput decreases.

Moreover, the processing performed in the image processing unit 3023 is the pseudo-halftone processing to perform line thinning on a portion of image data, and the light-source control unit 3024 converts the image data that has been subjected to the pseudo-halftone processing from data of resolution N to data of resolution m×N, and adjusts the amount of light for a part of the image data of resolution m×N based on resolution m×N.

In this case, the image data can be corrected (line thinning) at resolution N at the image processing unit 3023, and the amount of light for a part of the image data that has been corrected and made into higher resolution can be adjusted based on resolution m×N at the light-source control unit 3024.

Moreover, the light-source control unit 3024 detects an edge portion of image data at resolution N that has been subjected to the pseudo-halftone processing, and adjusts the amount of light for the edge portion that has been detected and made into higher resolution, based on resolution m×N.

In this case, the edge portion can be detected at resolution N (speedily), and correction to make the edge portion sharp can be achieved, for example, by increasing the amount of light for the edge portion that has been made into higher resolution from the normal amount of light (for example, the amount of light used when writing in solid black).

Furthermore, the light-source control unit 3024 performs the dot concentration processing on the edge portion of resolution m×N before adjusting the amount of light for the edge portion, and therefore, the edge portion can be corrected to be sharp without thickening a part of image data that has been subjected to the pseudo-halftone processing to perform line thinning, as much as possible.

Moreover, detection of an edge portion by the light-source control unit 3024 is performed by pattern matching on pixels around a target pixel among pixels that are arranged in a C×D (C, D: positive integers equal to or larger than 3) matrix in image data at resolution N. Therefore, an edge portion can be speedily and accurately detected.

Furthermore, when transmitting image data to the light-source control unit 3024, the image processing unit 3023 transmits object information that indicates an attribute (for example, character) of the image data. The light-source control unit 3024 detects an edge portion based on the object information.

In this case, detection of an edge portion is only required to be performed for a part corresponding to the object information of the image data, and therefore, processing speed increases, thereby leading to improvement in throughput.

Moreover, the light source includes a surface-emitting laser array that has multiple light emitting units, and therefore, by adjusting the amount of light emitted by each of the light emitting units based on modulation data generated by the light-source control unit 3024, high-resolution images having high granularity and sharpness can be formed at high speed.

Although in the above embodiment, the line thinning processing, the edge detection (detection of an edge portion), the conversion into higher resolution, and the edge enhancement processing (the dot concentration processing+light amount adjustment) are performed, it is not limited thereto. For example, the dot concentration processing is not required to be performed. Moreover, instead of the line thinning processing and the edge enhancement processing, processing to perform line thinning may be performed by reducing the amount of light for an edge portion.

Furthermore, although in the above embodiment, the line thinning processing is performed on character data, instead of this or in addition to this, thickening processing may be performed (refer to FIG. 17A). In this case, lines of character data can be corrected to desirable thickness. The character data that has been subjected to the thickening processing may be converted into higher resolution data, and the dot concentration processing may be performed on a portion (a portion to be an edge finally) that is adjacent to an edge portion of the character data converted into higher resolution data (refer to FIG. 17B). Moreover, the edge portion may be enhanced by applying more amount of light to the portion adjacent to the edge portion than the amount of light for the edge portion (refer to FIG. 17B). As a result, non-fuzzy characters with sharp lines can be formed. When enhancing the edge portion, the dot concentration processing may be not performed. In this case, it is possible to avoid thinning the line that has been subjected to the thickening processing.

Furthermore, although in the above embodiment, an edge portion of character data is detected at resolution N (for example 1200 dpi), that is, before conversion into higher resolution data, the edge portion may be detected at resolution m×N (m is a positive integer equal to or larger than 2), that is, after the character data is converted into higher resolution data. Specifically, the character data may be converted into higher resolution data in the pattern matching unit and pattern matching may be performed on the character data that has been converted into higher resolution data. In this case, the edge portion of the character data can be detected further precisely.

Moreover, although in the above embodiment, pattern matching is performed on pixels around a target pixel among nine pixels arranged in a 3×3 matrix, it is not limited thereto. It is only required to perform pattern matching on pixels around a target pixel among pixels arranged in a C×D (C, D: positive integers equal to or larger than 3) matrix.

Furthermore, although in the above embodiment, resolution N at which processing is performed in the image processing unit is 1200 dpi, it is not limited thereto, and may be changed as necessary. Moreover, although the resolution of modulation data that is generated in the light-source control unit is 2400 dpi or 4800 dpi as an example, it is only required to be m×N (m is a positive integer equal to or larger than 2).

Furthermore, the configurations of the image processing unit and the light-source control unit are not limited to ones explained in the above embodiment, and may be modified as necessary.

Moreover, although the above embodiment has been explained using character data as image data to be processed as an example, it is not limited thereto, and the processing described above may be performed on, for example, image data of a line, a figure, a numeral, a symbol, or the like. It is preferable that object information indicating an attribute of the image data be sent from the image processing unit to the light-source control unit in either case.

Furthermore, although in the above embodiment, the light source includes a surface-emitting laser array having multiple surface emitting lasers, it is not limited thereto. For example, a semiconductor laser array having multiple semiconductor lasers (laser diode: LD), a light-emitting diode array having multiple light emitting diodes (LED), or the like may be used.

Moreover, although the color printer 2000 according to the present embodiment includes an optical scanning device that scans on a photosensitive drum by light from a light source, it is not limited thereto, and the color printer 2000 may include, for example, an optical print head having multiple light emitting diodes.

Furthermore, although in the above embodiment, the light source includes more than one light emitting unit, the light source may include just one light emitting unit.

Moreover, although in the above embodiment, a case in which the image forming apparatus includes four photosensitive drums has been explained, it is not limited thereto. Specifically, the image forming apparatus may be, for example, a color printer that includes five or more photosensitive drums, or a black and white printer that includes a single photosensitive drum.

Furthermore, although in the above embodiment, a case of the color printer 2000 as an image forming apparatus has been explained, it is not limited thereto, and, the image forming apparatus may be, for example, an optical plotter or a digital copying machine.

According to an embodiment, image quality can be improved while suppressing throughput reduction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image by irradiating light from a light source to an image carrier, comprising:
   circuitry configured to:
   perform pseudo-halftone processing on image data at resolution N,
   generate modulation data to drive the light source at resolution m×N (m is a positive integer equal to or larger than 2), which is higher than the resolution N, based on the processed image data, wherein the circuitry is configured to convert the image data at the resolution N that has been subjected to the pseudo-halftone processing into data at the resolution m×N, and adjust an amount of light from the light source for a part of the image data at the resolution m×N, and generate modulation data based on which the light source is driven at a different light emission power from when the light amount adjustment is not performed for a part of the image data, wherein the circuitry is configured to detect an edge portion of the image data at any one of the resolution N and the resolution m×N, subjected to the pseudo-halftone processing, and adjust, based on the resolution m×N, an amount of light from the light source for the edge portion and a portion adjacent to the edge portion of the image data at the resolution m×N, wherein the amount of light for the portion adjacent to the edge portion is more than the amount of light for the edge portion, and wherein the circuitry is configured to detect the edge portion based on character attributes.

2. The image forming apparatus according to claim 1, wherein
the circuitry is configured to perform a dot concentration processing on any one of the edge portion and the portion adjacent to the edge portion of the image data at the resolution m×N before adjusting the amount of light from the light source.

3. The image forming apparatus according to claim 1, wherein
detection of the edge portion is performed by pattern matching on pixels around a target pixel among pixels that are arranged in a C×D (C, D: positive integers equal to or larger than 3) matrix in the image data at any one of the resolution N and the resolution m×N.

4. The image forming apparatus according to claim 1, wherein
the light source includes a surface-emitting laser array that has multiple light emitting Units.

5. An image forming method of forming an image by irradiating light from a light source to an image carrier, comprising:
performing pseudo-halftone processing on image data at resolution N; and
generating modulation data to drive the light source at resolution m×N (m is a positive integer equal to or larger than 2) based on the processed image data, wherein
converting the image data at the resolution N that has been subjected to he pseudo-halftone processing into data at the resolution m×N, and adjusting an amount of light from the light source for a part of the image data at the resolution m×N at the generating, and generating modulation data based on which the light source is driven at a different light emission power from when the light amount adjustment is not performed for a part of the image data,
detecting an edge portion of the image data at any one of the resolution N and the resolution m×N subjected to the pseudo-halftone processing, and adjusting an amount of light from the light source for the edge portion and a portion adjacent the edge portion of the image data at the resolution m×N based on the resolution m×N,
wherein the amount of light for the portion adjacent to the edge portion is more than the amount of light for the edge portion, and
wherein the detecting of the edge portion based on character attributes.

* * * * *